United States Patent [19]

Lutener

[11] 4,237,977
[45] Dec. 9, 1980

[54] REMOVAL OF WATER FROM GAS WELL BOREHOLE WITH SOLID FOAMING AGENT

[75] Inventor: Stuart B. Lutener, Edmonton, Canada

[73] Assignee: Skyline Products Ltd., Fort Saskatchewan, Canada

[21] Appl. No.: 8,550

[22] Filed: Feb. 2, 1979

[51] Int. Cl.$^3$ .............................................. E21B 21/14
[52] U.S. Cl. .................................. 166/309; 166/311; 252/8.55 B; 252/307
[58] Field of Search ............... 166/279, 300, 309, 311; 252/8.55 B, 307

[56] References Cited

U.S. PATENT DOCUMENTS

| | | | |
|---|---|---|---|
| 2,470,719 | 5/1949 | Perri | 252/307 |
| 3,076,508 | 2/1963 | Lissant | 252/8.55 B X |
| 3,155,178 | 11/1964 | Kirkpatrick | 166/309 X |
| 3,164,206 | 1/1965 | Sharp | 166/309 X |
| 3,174,929 | 3/1965 | Andersen | 166/309 X |
| 3,305,019 | 2/1967 | Katzer | 252/8.55 B |

OTHER PUBLICATIONS

Dunning et al, Using Foaming Agents to Remove Liquids from Gas Wells, Monograph 11, Bureau of Mines, 1952, pp. 11-14, 35-37.

*Primary Examiner*—James A. Leppink
*Assistant Examiner*—George A. Suchfield
*Attorney, Agent, or Firm*—Max L. Wymore

[57] ABSTRACT

A process for producing a solid foaming agent, and a process for using the foaming agent for the removal of water from flooded gas wells is provided. The foaming agent is formed by first combining a water soluable, nonionic polyethoxylated surfactant with urea to form a solid urea adduct, and compressing the urea adduct under high pressures into a shape of size and density to enable it to drop to the bottom of a column of water existing in the well. The urea adduct is dropped into the flooded well bore and gas produced through the water generates foam which is expelled from the well with the gas flow.

18 Claims, No Drawings

REMOVAL OF WATER FROM GAS WELL BOREHOLE WITH SOLID FOAMING AGENT

BACKGROUND OF THE INVENTION

This invention relates to a process for producing a solid foaming agent body and to a process of using said body for the removal of water from a gas well borehole by foam generation.

When a gas well is flooded, a column of water forms in the borehole which reduces the flow of the gas from the well. Several methods exist to remove the water from the borehole. For example, the water may be pumped to the surface; however, this is both time and energy consuming. Liquid foaming agents are available which may be pumped to the bottom of the column of water to attain efficient foam generation, but they involve the expense of servicing the well. A preferred alternative is to drop a solid foaming agent down the borehole. As the solid dissolves, gas from the producing zone passing through the column of water generates foam which allows the water to be blown out of the well.

In principle, any water soluable surface active agent with foaming capabilities could be used to remove water from boreholes by foam generation. However, when it is desirable to use a solid foaming agent, certain classes of surfactants are preferred. In particular, some members of the class of polyethyoxylated nonionic surfactants, being hard waxes at ambient temperatures, can be readily melted and cast into molds for use as solid foaming agents. Inorganic salts may be added to increase the bulk density of such compositions. An example of this type of foaming agent is disclosed in U.S. Pat. No. 3,251,417 to Holman et al.

These solid foaming agents are usually molded into long cylindrical sticks approximately 3 cm in diameter and 30 to 50 cm in length. During warm weather these products tend to become soft and waxy and are difficult to drop down the well borehole.

A more serious problem of these prior art compositions is their low rate of solubility. In order to generate foam in a reasonably short period of time an excessive quantity of the solid foaming agent is added to the well. Even in large amounts, these foaming agents often take in the order of 3 to 4 hours to expel water from the well. After most of the water has blown out of the well, the foaming agent continues to slowly dissolve in the residual water. The foam thus generated becomes incorporated in the gas production, which is undesirable.

It is known in the field of surfactant chemistry to combine liquid surfactants or detergents with urea to form solid urea adducts. The adducts decompose in water to release urea and the uncomplexed surfactant. It has generally been found that urea adducts can be formed with many straight chained hydrocarbons, fatty acids and alcohols, whereas highly branched hydrocarbons remain substantially uncombined with urea. Urea forms a helical structure in which the surfactant is trapped or held. Apparently straight chain hydrocarbons, or those with a low degree of branching or ring formation can more easily fit into the helical structure and thus form the urea adducts.

To our knowledge no one has yet attempted to utilize these urea adducts in the removal of water from well boreholes.

SUMMARY OF THE INVENTION

The present invention provides a process for removing water from a gas well and involves utilizing a solid foaming agent formed by combining a water-soluble surfactant with urea to obtain a solid urea adduct. The solid adduct is dropped into the column of water in the well. The urea rapidly dissolves, releasing the surfactant which acts to foam the water, as gas is produced through the column. The gas flow gradually removes the foam from the well.

In a preferred form of the invention, the solid foaming agent is provided by first mixing urea with a water-soluable non-ionic polyethoxylated surfactant for form the adduct and then compressing the adduct under high pressure into a shape of sufficient size and density to enable it to drop through the well bore to the bottom of the water column. By this size and density criteria is meant that the foaming agent is in a form which fits into the gas borehole, and has a density sufficiently greater than water to permit it to drop through the flooded borehole.

In a more preferred form, the urea is combined with the surfactant in a ratio in the range of about 1:1 to 9:1 by weight respectively.

In another preferred feature of the invention, a lubricant is added to the urea adduct to assist in the compression operation. A polyethylene glycol having a molecular weight of about 400 to 6000 is satisfactory for this purpose.

DESCRIPTION OF THE PREFERRED EMBODIMENT

The surfactant used in the formation of the solid foaming agent is a non-ionic water-soluble polyethyoxylated compound having the general formula

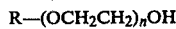

$$R-(OCH_2CH_2)_nOH$$

where R is a lipophilic group and n is a whole number.

Three factors generally restrict the type of surfactant which can be used. The surfactant must have a structure which enables it to form a solid adduct with urea, and must also be sufficiently water soluble to give the desirable rapid foaming action. Further, the rate of water solubility should be sufficiently fast to give a rapid foaming capability to the foaming agent.

The lower value of n is limited to that value which will confer water solubility to the lipophilic moiety. For this purpose n must usually be at least 6. Increasing the value of n, in general, allows the physical form of the non-ionic surfactant to vary from a liquid (n=9 to 14), to a semi-solid (n=12 to 14), to a hard wax (n=20 to 150). These ranges vary with the particular lipophilic group.

Suitable lipophilic groups include mono or dialkyl phenols, fatty carboxylic acids, and fatty alcohol residues.

The urea used in the process of the present invention is usually provided in the form of granules or pellets which are crushed to a fine powder prior to mixing with the surfactant. This step has been found to greatly influence the efficiency of adduct formations; in general, the finer the particle size of the urea the more rapid and complete the adduct formation.

The urea is combined with the surfactant in a ratio in the range of about 9:1 to 1:1 by weight respectively. This range is not critical to the product formed, however, it is found to be a practical working range. With greater amounts of surfactants, the product formed tends to be waxy, slower to solidify, and slower dissolving in water, while with lower amounts of surfactant, the urea is merely diluting the surfactant beyond practical limits. The most desirable compositions, that is those which solidify within a few days to form a urea adduct that is water soluble, result from using a urea to surfactant ratio of about 9:1 to 3:1 by weight respectively.

A urea-surfactant mixture derived from a liquid or semi-solid surfactant initially appears as a moist composition which solidifies gradually as the urea adduct is formed to take on a dry appearance. This provides a simple visual assurance of complete adduct formation. The solid surfactants, on the other hand, are melted prior to combining with the urea. As the latter compositions solidify it is more difficult to ascertain whether, in fact, a urea adduct has formed, or the solid surfactant has merely resolidified unreacted.

To increase the lubricity of the urea-surfactant adduct during the compression step, a lubricant can be used. Incorporating with the adduct about 1–30% by weight of a polyethylene glycol with an average molecular weight between 400 and 6000 has been found to facilitate in the compression of many of the drier compositions. These drier forms of the adduct result from using large amounts of the urea. Often, when lower amounts of urea are included in the adduct, the surfactant itself acts as a lubricant for the compression. Other lubricants familiar to the art of tablet-pressing may be suitable.

The foaming agent is prepared by adding the liquid surfactant slowly with thorough mixing to the powdered urea, and lubricant if required. If a solid or semi-solid surfactant is being used it is melted and added to the mixed urea-lubricant mixture. The resulting moist composition is allowed to solidify for 24 to 48 hours to form a dry, solid urea adduct. Often the adduct exists in hard clumps which are crushed in a suitable grinder. The adduct is then compressed at high pressures into a shape of size and density sufficient to enable it to be dropped to the bottom of a column of water existing in a well borehole. Typically, the adduct is pressed into a cylindrical stick about 1.25" in diameter and 4.5" in length having a weight of about 4 ounces.

The size and shape of the compressed foaming agent are restricted by the physical limitations of the well borehole. Usually there is a 2 in. valve at the well head through which the compressed product must pass. The density of the foaming agent, once compressed, must be sufficiently greater than water to enable the product to drop through the flooded borehole. Typically a density greater than 1.2 g/cm$^3$ is sufficient for this purpose.

The compressed foaming agent when dropped into a flooded gas borehole, dissolves to lower the surface tension of the water. The reduced gas flow through this water causes foam generation, which foam is blown out of the well. If the flow of gas in the gas well has been stopped by large quantities of water, an external source of compressed air is required to generate the foam.

The quantity of foaming agent required to remove the water necessarily vary with the depth, pressure and amount of water in the particular well.

The following example is illustrative of the present invention.

EXAMPLE 1

A urea adduct was formed by combining in the following weighted amounts:
- 20% polyethyoxylated $C_{12}$–$C_{15}$ linear alcohol containing 69% ethylene oxide, or 20% polyethoxylated $C_{10}$–$C_{12}$ linear alcohol containing 60% ethyleneoxide;
- 75% powdered urea; and
- 5% polyethylene glycol of molecular weight 4000.

The powdered urea and the polyethylene glycol 4000 were intimately mixed. The polyethoxylated compound was melted at 35° C. and added over 15 min. with mixing to the urea-lubricant mixture. After 30 minutes of mixing, the free-flowing granular composition was run out and stored 24 to 48 hours to form a dry, granular urea adduct.

The adduct was compressed to 6000 psig into 4 ounce, 1.25 in.×4 in. cylindrical sticks with the use of a hydraulic press. The product thus formed had a density of about 1.25 g/cm$^3$.

The foaming agent thus formed was tested in a number of shallow gas wells having relatively low pressures and located in the Medicine Hat and Milk River areas of Southern Alberta. The wells had an average depth of about 1500 to 3000 feet and a bottom hole pressure of about 400 to 500 psi.

With the variation in depth, pressure and amount of water to be displaced in the wells, varying quantities of the foaming agent were used. Usually 1 to 4 sticks were dropped into the well and water unloading occurred within 7 to 25 minutes.

FEATURES AND ADVANTAGES

The following features and advantages are achieved by the preferred embodiment of the present invention.
(1) The solubility rate in water of the polyethoxylated nonionic surfactant is improved due to the dispersed and finely divided state which is achieved in the urea adducts. This ultimately increases the speed at which foam can be generated in the water flooded well.
(2) Solidification of the surfactants with urea improves the temperature stability of the solid foaming agents. Whereas many of the prior art forming agents were subject to melting at ambient temperatures.
(3) A large range of suitable surfactants can be utilized since both liquid and solid surfactants will form solid urea adducts.
(4) The density of the solid foaming agent is increased with the use of urea. Urea has a density of 1.34 g/cm$^3$ so, when combined with the surfactant, results in a product which can be compressed to a density sufficient to enable it to drop through the water flooded borehole.

The embodiments of the invention in which an exclusive property or privilege is claimed are defined as follows:

1. The process for producing a solid foaming agent body for the removal of water from a gas well comprising:
    combining a water-soluble non-ionic polyethoxylated surfactant with urea to form a solid urea adduct; and
    compressing the urea adduct into a shape of size and density sufficient to enable it to drop to the bottom of the column of water expected to be existing in the well.

2. The process as set forth in claim 1 wherein:
the urea is mixed with the surfactant in a ratio in the range of about 1:1 to 9:1 by weight respectively.

3. The process as set forth in claim 2 comprising:
adding a lubricant to the urea adduct to aid in the compressing step.

4. The process as set forth in claim 3 wherein:
the lubricant is a polyethylene glycol having a molecular weight of about 400 to 6000.

5. The process as set forth in claim 4 wherein:
the surfactant is a polyethoxylated linear $C_{12}$–$C_{15}$ alcohol.

6. The process as set forth in claim 4 wherein:
the surfactant is a polyethoxylated linear $C_{10}$–$C_{12}$ alcohol.

7. The process as set forth in claim 2 wherein:
the surfactant is a polyethoxylated linear $C_{12}$–$C_{15}$ alcohol.

8. The process as set forth in claim 2 wherein:
the surfactant is a polyethoxylated linear $C_{10}$–$C_{12}$ alcohol.

9. A process for removing water from a gas well which comprises:
combining a water-soluble non-ionic polyethoxylated surfactant with urea to form a solid urea adduct;
compressing the urea adduct into a shape of size and density sufficient to enable it to drop to the bottom of the column of water expected to be existing in the well; and
dropping the urea adduct into the water in the gas well and producing gas through the water to generate foam, thereby gradually removing said form from the well.

10. The process as set forth in claim 9 wherein:
the urea is mixed with the surfactant in a ratio in the range of about 1:1 to 9:1 by weight respectively.

11. The process as set forth in claim 10 comprising:
adding a lubricant to the urea adduct to aid in the compressing step.

12. The process as set forth in claim 11 wherein:
the lubricant is a polyethylene glycol having a molecular weight of about 400 to 6000.

13. The process as set forth in claim 12 wherein:
the surfactant is a polyethoxylated linear $C_{12}$–$C_{15}$ alcohol.

14. The process as set forth in claim 12 wherein:
the surfactant is a polyethoxylated linear $C_{10}$–$C_{12}$ alcohol.

15. The process as set forth in claim 10 wherein:
the surfactant is a polyethoxylated linear $C_{12}$–$C_{15}$ alcohol.

16. The process as set forth in claim 10 wherein:
the surfactant is a polyethoxylated linear $C_{10}$–$C_{12}$ alcohol.

17. The process for producing a solid foaming agent body for the removal of water from a gas well comprising:
combining a water-soluble surfactant with urea to form a solid urea adduct; and
compressing the urea adduct into a shape of size and density sufficient to enable it to drop to the bottom of the column of water expected to be existing in the well.

18. A process for removing water from a gas well which comprises:
combining a water-soluble surfactant with urea to form a solid urea adduct;
compressing the urea adduct into a shape of size and density sufficient to enable it to drop to the bottom of the column of water expected to be existing in the well; and
dropping the urea adduct into the water in the gas well and producing gas through the water to generate foam, thereby gradually removing said foam from the well.

* * * * *